United States Patent [19]
Luckenbach

[11] 3,902,990
[45] Sept. 2, 1975

[54] CATALYST REGENERATION PROCESS AND APPARATUS

[75] Inventor: Edward C. Luckenbach, Mountainside, N.J.

[73] Assignee: Exxon Research and Engineering Company, Linden, N.J.

[22] Filed: Mar. 18, 1974

[21] Appl. No.: 451,805

[52] U.S. Cl. ............... 208/164; 23/288 S; 252/417
[51] Int. Cl. .......................................... C10g 11/18
[58] Field of Search ............ 208/164; 252/416, 417

[56] References Cited
UNITED STATES PATENTS

| | | | |
|---|---|---|---|
| 2,465,255 | 3/1949 | Moorman | 252/417 |
| 2,471,034 | 5/1949 | Hall et al. | 252/417 |
| 2,751,332 | 6/1956 | Gornowski et al. | 252/417 |
| 2,767,126 | 10/1956 | Rice | 252/417 |
| 2,800,461 | 7/1967 | Kearby et al. | 252/417 |
| 2,843,460 | 7/1956 | Borey et al. | 208/164 |
| 2,857,240 | 10/1958 | Quincy | 208/164 |
| 3,661,799 | 5/1972 | Cartwell | 252/417 |

*Primary Examiner*—Herbert Levine
*Attorney, Agent, or Firm*—Marthe L. Gibbons

[57] ABSTRACT

Regeneration of spent catalyst contaminated by a carbonaceous deposit is conducted by contacting the spent catalyst with a hot flue gas emanating from a first dense phase regeneration zone. The heated spent catalyst is then contacted countercurrently with an oxygen-containing gas in the first dense phase regeneration zone to produce partially regenerated catalyst which is subsequently contacted concurrently with an oxygen-containing gas in a second dense phase regeneration zone.

3 Claims, 2 Drawing Figures

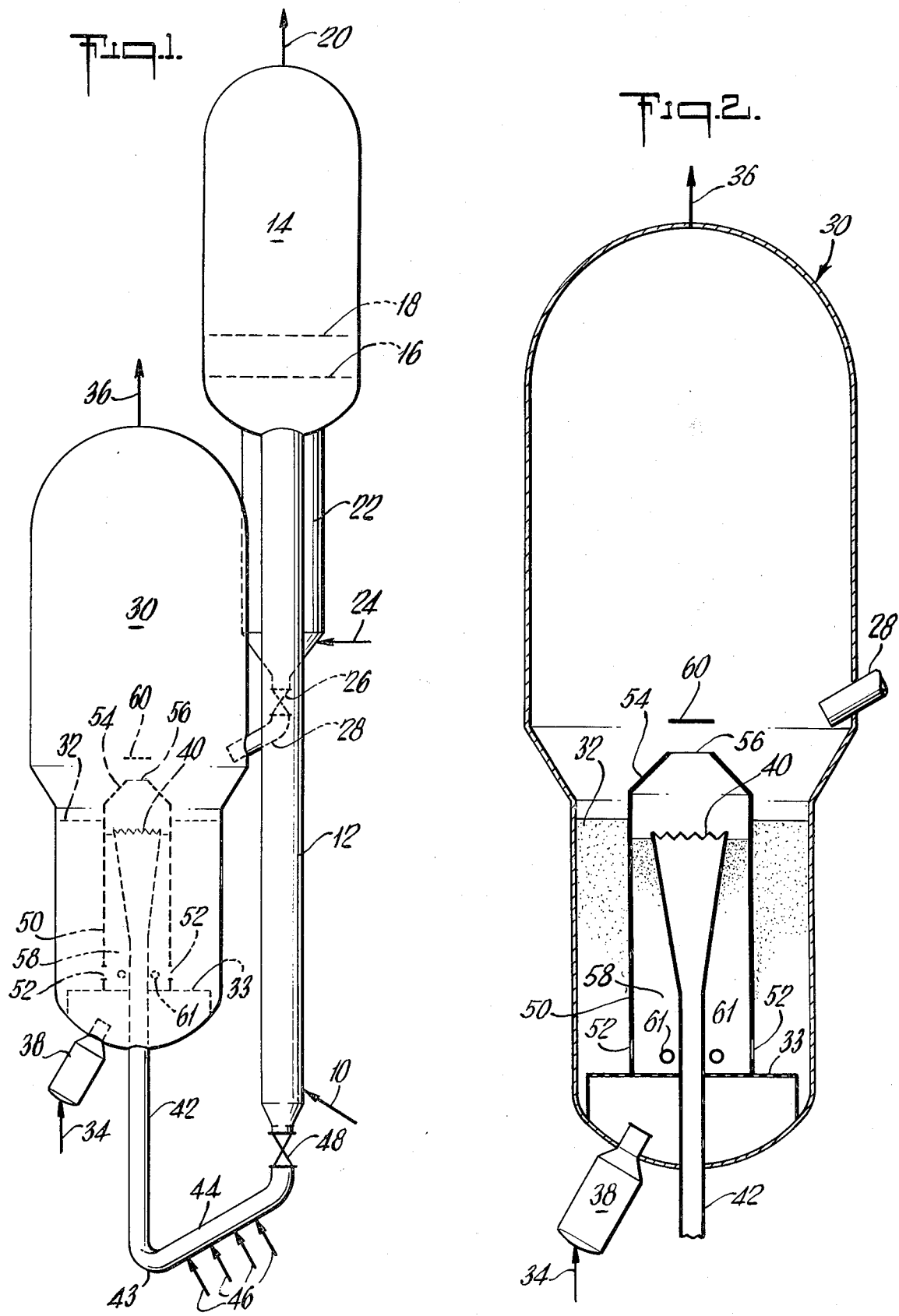

CATALYST REGENERATION PROCESS AND APPARATUS

BACKGROUND OF THE INVENTION

1. Field of the Invention

This invention relates to a process and apparatus for regenerating spent catalyst utilized in hydrocarbon conversion processes. The invention is applicable to fluidized systems wherein finely divided catalyst is continuously recycled between a reaction zone and a separate regeneration or reactivation zone. It is particularly applicable to the regeneration of spent fluid catalytic cracking catalyst.

2. Description of the Prior Art

Catalytic hydrocarbon conversion processes wherein a catalyst that has become partially inactivated due to carbonaceous deposits is regenerated by combustion with an oxidizing gas and in which the regenerated catalyst is recycled to the reaction zone are well known to those skilled in the art.

It is also known that spent catalyst can be regenerated in more than one stage of regeneration (see, for example, U.S. Pat. No. 3,767,566 and *Hydrocarbon Processing*, September 1972, page 136).

In such prior art processes, the sensible heat of the flue gas produced by the combustion of the carbonaceous deposit of the catalyst is lost to the process. Furthermore, currently, a large degree of afterburn is practiced in some units to keep the carbon monoxide effluent from the regenerator at an absolute minimum. This afterburn is produced since the unit has a large amount of oxygen leaving the top of the bed and the residual carbon monoxide leaving the bed is burned in the dilute phase zone above the bed where little catalyst is present. Since there is no catalyst heat sump, the temperature rises as much as 140°F. to the 1400°F.± level. Since it is desirable to minimize temperature from the standpoint of minimizing thermal deactivation of the catalyst, any means to reduce this temperature will result in more active catalyst and improved yields of gasoline or improved conversion. The present invention will lower the temperature in the upper part of the regenerator and thereby reduce the degree of afterburn.

Additionally, it is now necessary to quench the regenerator off-gases to about 1200°F. due to temperature limitations on the blading of flue gas expanders or to prevent using very costly alloy materials in the flue gas circuit. The quench is usually a water spray. This spray results in a direct loss of energy from the process due to the unrecoverable heat of vaporization. The present invention will eliminate the need for this spray.

It has now been found that improved results can be obtained in a catalyst regeneration process carried out in a specified manner.

SUMMARY OF THE INVENTION

In accordance with the invention, there is provided, in a process for the catalytic conversion of hydrocarbons in a fluidized reaction zone wherein the spent conversion catalyst is separated from the reaction zone effluent, stripped of volatile hydrocarbons, regenerated by combustion of carbonaceous deposits and recycled to the reaction zone, the improvement which comprises: contacting the stripped spent catalyst in a dilute phase zone with a hot flue gas emanating from a first dense phase regeneration zone to heat said stripped spent catalyst and cool said hot flue gas; contacting the heated stripped spent catalyst with an oxygen-containing gas in said first dense phase regeneration zone to effect partial regeneration of said catalyst, and contacting the partially regenerated catalyst concurrently with an oxygen-containing gas in a second dense phase regeneration zone.

Furthermore, in accordance with the invention, there is provided, in a regenerator vessel adapted to contain a bed of fluidized catalyst, which comprises: a section of a standpipe having an enlarged diameter open end forming an overflow well for withdrawing regenerated catalyst from said regenerator vessel, said standpipe section being disposed in concentric relation to the vertical axis of said regenerator vessel; catalyst inlet means; gas outlet means, and gas inlet means, the improvement which comprises: a cylindrical baffle disposed around an upper portion of said standpipe section, said baffle comprising at least one orifice at its lower portion for direct passage of catalyst from said dense bed into an annular zone formed by said cylindrical baffle and said section of standpipe, and means for introducing a gas into said annular zone.

The baffling of the present invention promotes general countercurrency of catalyst flow with regenerator gas flow in the major portion of the regenerator bed. It permits quenching of the gases leaving the bed at 1200° to 1400°F. with the relatively cooler spent catalyst of 900° to 1100°F. It also prevents the direct short circuiting of the spent catalyst across the top of the bed to the top of the overflow well and out of the regenerator. The baffle may have a conical top to keep the catalyst which is raining down out of the dilute phase zone (deentrainment) from falling into the top of the well and thus short circuiting the bed.

Other methods are available for accomplishing staging, such as, separate vessels, or totally baffled vessels or partially baffled vessels.

These known methods have many disadvantages. For a separate vessel staging method, there is the need for a separate additional catalyst transport conduit and large investment in an extra vessel and catalyst recovery equipment. For a fully baffled vessel, there is the problem that there may be an unbalance of gas flow on either side of the baffle thus overloading the catalyst recovery equipment on one side and underloading on the other. Some regenerators have been shown to have baffles extending up the vessel to slightly above the bed level. There is much catalyst carried up into the dilute phase above the bed which falls back to the bed. Such a baffle does not prevent cross-over of the deentrained material which can reduce the effectiveness of the staging. In none of these partially shrouded vessels is the spent catalyst introduced to the dilute phase above the primary regeneration bed.

BRIEF DESCRIPTION OF THE DRAWING

FIG. 1 illustrates, in schematic form, a suitable apparatus for carrying out a preferred embodiment of the invention.

FIG. 2 is an enlarged view of the regenerator vessel of FIG. 1.

DESCRIPTION OF THE PREFERRED EMBODIMENT

The preferred embodiment will be described with reference to the accompanying drawing and as applied to catalytic cracking of hydrocarbons, for simplicity, but it should be understood that the invention is equally applicable to other hydrocarbon conversion processes such as naphtha reforming, hydrogenation, dehydrogenation, isomerization, etc., provided that appropriate catalyst and operating conditions be employed as required for the particular conversion process.

Referring to FIG. 1, a suitable hydrocarbon feed is injected via line 10 into transferline riser 12 which contains hot regenerated catalyst. Upon injection, the hydrocarbon feed is vaporized by contact with the hot catalyst. The resulting suspension of vaporized hydrocarbon and catalyst flows upwardly through the straight vertically disposed transferline riser where at least a portion of the hydrocarbon feed is cracked to lower boiling products. The density of the catalyst in the suspension may range generally from about 0.5 to about 10 pounds per cubic foot, preferably, from about 1 to 4 pounds per cubic foot. The suspension passes through the transferline riser (reactor) at a velocity between about 8 and 60 feet per second. The catalyst hold-up in the transferline riser, using conventional silica-alumina cracking catalyst of the size between 10 and 300 microns with an average particle diameter of about 60 microns, may be between 1 and 12 tons for a 50,000 barrels per day unit. The pressure in the transferline riser may be between 9 and 40 pounds per square inch gauge (psig), for example, about 35 psig. The cracking temperature in the transferline riser may be between 825°F. and 1150°F., with the temperature at the inlet being higher than at the outlet of the transferline riser. Suitable space velocity in the transferline riser may range from about 25 to about 150 weight parts of hydrocarbon feed per hour per weight part of catalyst, and the catalyst to oil weight ratio may be between 2 and 12. The length to diameter (L/D) of the transferline riser may be between 6 and 30. Desirably, the length to diameter ratio of the transferline riser is such as to provide three seconds of gas resistance when the gasiform suspension of catalyst flows through the transferline at an average velocity of about 30 feet per second. The transferline riser projects upwardly into the lower portion of a gas-solids disengaging vessel 14 and terminates beneath distributing grid 16. Vessel 14 is positioned at a spaced distance and adjacent to regenerator vessel 30. Desirably, at least a portion of it is also positioned at a higher level than the top of vessel 30. The riser enters into the bottom cone of vessel 14 directly under grid 16 which is welded directly to the vessel shell. The suspension passes into a dense bed of fluidized catalyst having a level indicated at 18 where further hydrocarbon conversion occurs. The cracked hydrocarbon vapors pass through the upper level of the dense fluidized bed into a superimposed dilute phase and cyclone separator (not shown) disposed in the upper portion of vessel 14, to separate product vapors from entrained catalyst particles. The catalyst particles are returned to the dense bed via cyclone diplegs and the product vapors are removed via product outlet line 20. Desirably, the cyclone separator may be a two-stage cyclone system. Alternatively, when increased gasoline boiling range product is desired, the dense fluidized bed may be omitted in vessel 14 and the transferline may be extended into the vessel such that the main conversion of hydrocarbons may occur in the transferline. In this alternative embodiment, the transferline may also terminate directly in a cyclone separator. The lower portion of vessel 14 comprises a stripping zone 22 in which hydrocarbons which adhere to spent catalyst are removed by stripping with a stripping gas, such as, steam introduced via line 24. Desirably, grid 16 is sloped to facilitate the flow of spent catalyst into stripping zone 22. The stripping zone is offset 180° from the transferline entrance into vessel 14. The pressure balance of the unit will allow the catalyst level in the stripping zone to be held either somewhat above grid 16 to provide a higher hold-up operation or it can be held very low in the stripping zone so as to provide dilute phase stripping. Spent stripped catalyst flows from the stripper via control valve 26 into conduit 28 which terminates in regenerator vessel 30 in a dilute phase zone above upper level 32 of a dense fluidized bed of catalyst undergoing regeneration in the lower portion of the regenerator vessel. As the stripped spent catalyst is discharged from conduit 28, it flows in a downward direction and is contacted by a hot upflowing flue gas which emanates from the dense fluidized regeneration bed. The catalyst is heated and the flue gas correspondingly cooled by this direct heat exchange. The heated catalyst continues to flow down into the dense fluidized regeneration bed which is maintained at a temperature ranging from about 1100°F. to about 1400°F. and at a pressure ranging from about 10 psig to about 50 psig. An oxygen-containing gas (air) is introduced via line 34 into an auxiliary burner 38 attached to the bottom of the regenerator vessel for heating the unit on start-up of the process. The oxygen-containing gas flows from the auxiliary burner into the interior bottom portion of the regenerator and passes through perforated grid 33 into the dense fluidized bed, at a superficial vapor velocity sufficient to maintain the catalyst particles above grid 33 as a dense fluidized bed and to produce the desired level of regeneration. Suitable superficial vapor velocity includes a range of about 2 feet per second to about 6 feet per second. By superficial vapor velocity is intended herein the linear velocity that the gas would have provided no solids were present in a given zone. Flue gas formed by combustion of the carbonaceous deposit and entrained solids pass through a cyclone separator system (not shown) disposed in the regenerator. Solids are returned via cyclone dipleg to the fluidized bed while flue gases are removed overhead via line 36. A cylindrical baffle 50 is positioned in the dense fluidized regeneration bed in spaced concentric relation to the wall of the regenerator shell. Cylindrical baffle 50 is provided with a number of orifices 52 in its lower portion. The upper portion of the baffle terminates in a conical section 54 having a central hole 56. Cylindrical baffle 50 surrounds an overflow well 40 located on the centerline of the regenerator vessel. The well serves to hold the catalyst level constant in the regenerator. The well is the open upper end of a downflow withdrawal standpipe 42 which extends into the regenerator vessel. The partially regenerated catalyst flows from the dense regeneration bed through orifices 52 into an annular zone 58 formed by cylindrical baffle 50 and the section of standpipe 42 which extends through cylindrical baffle 50. A portion of the oxygen-containing gas which was introduced into the regenerator vessel flows through the perforated grid 33 into annular zone 58. The gas contacts the partially regenerated catalyst concurrently and completes the desired degree of regeneration by combustion of an additional amount of carbonaceous deposit from the catalyst, as well as, moves the catalyst particles upwardly.

A coil with holes 61 for distribution of an oxygen-containing gas can be provided in the bottom of the annular zone so as to permit control of the degree of regeneration occurring in the annular zone. The oxygen-containing gas may be introduced via holes 61 into the annular zone, for example, at a superficial velocity ranging from about 2.5 feet per second to about 4.5 feet per second.

The temperature in the annular zone 58 (which functions as a second dense phase regeneration zone) is maintained at a temperature of about 1120°F. to about 1410°F. The temperature rise is dependent upon the amount of additional regeneration accomplished. Flue gas exits through orifice 56 of the conical top of cylindrical baffle 50 and regenerated catalyst flows into overflow well 40. The conical top of the cylindrical baffle serves to prevent spent catalyst from falling into the interior of cylindrical baffle 50. A deflector 60 is provided at a spaced distance above orifice 56 to assist in keeping spent catalyst from falling into cylindrical baffle 50.

The regenerated catalyst which has been moved upwardly in annular zone 58 to the top of overflow well 40, flows into the well and moves down through standpipe 42 which is connected at its lower end by means of angle bend 43 with a vertically inclined conduit 44 which in turn connects with vertical transferline riser 12 which has a section projecting upwardly into vessel 14 as previously described. Aeration taps 46 in which a fluidizing gas, such as, steam may be injected, are provided along vertically inclined conduit 44. Desirably, the vertically inclined conduit is sloped at an angle of about 45°. If desired, a shut-off valve 48 may be provided at the entrance of the vertically inclined conduit into riser 12 or alternatively, it may be installed at the bottom of standpipe 42 for use in start-up of the unit or in an emergency. This shut-off valve will always be either wide open or closed tight since it is not required for actual regulation of catalyst circulation when the unit is in operation. This valve may be located essentially anywhere along the length of riser 12 or anywhere along the length of standpipe 42. Instead of a shut-off valve, a ceramic lined restriction orifice may be used.

A specific example of the heat balance of the regeneration process of the invention is as follows:

If the catalyst circulation is 21.6 tons per minute and the reaction zone temperature is 900°F., a 1400°F. flue gas emanating from the regeneration dense bed would heat the spent 900°F. catalyst particles introduced from the reactor into the regenerator to about 966°F., while cooling the flue gas to 966°F. The calculated heat recovered in the regenerator under the conditions given in this example is 42 $\overline{M}$ BTU/hr. This heat would normally be carried out with the flue gas.

What is claimed is:

1. In a process for the catalytic conversion of hydrocarbons wherein a fluidized catalyst is circulated in a system comprising a hydrocarbon conversion zone, a gas-solids disengaging zone wherein spent catalyst is separated from conversion zone effluent, a stripping zone wherein spent catalyst is stripped of volatile hydrocarbons, and a regenerator vessel containing a fluidized bed of catalyst undergoing regeneration by passage of a regeneration gas therethrough, the improvement which comprises:

a. introducing the stripped spent catalyst into said regenerator above said dense fluidized bed of catalyst and contacting the same with hot flue gas emanating from said dense fluidized bed to heat said catalyst;

b. passing the heated catalyst downwardly into said dense fluidized bed and contacting the same counter-currently with an oxygen-containing gas to regenerate the stripped catalyst partially;

c. passing the partially regenerated catalyst into a second dense phase regeneration zone disposed in said regeneration vessel and contacting the same concurrently with an upwardly flowing oxygen-containing gas to effect increased regeneration of the catalyst, said contacting being such that a flue gas emanating from said second dense phase zone bypasses said first dense phase zone, and d. passing the resulting regenerated catalyst into an open upper end of a standpipe disposed in said second dense phase regeneration zone.

2. The process of claim 1 wherein the first mentioned dense regeneration zone and said second regeneration zone are each annular zones, said second regeneration zone being disposed in inner concentric relation to said first regeneration zone.

3. The process of claim 1 wherein said hydrocarbon conversion process is catalytic cracking.

* * * * *